Jan. 4, 1944.  J. POSCAVAGE ET AL  2,338,598
AERIAL PARACHUTE BOMB
Filed Jan. 9, 1941
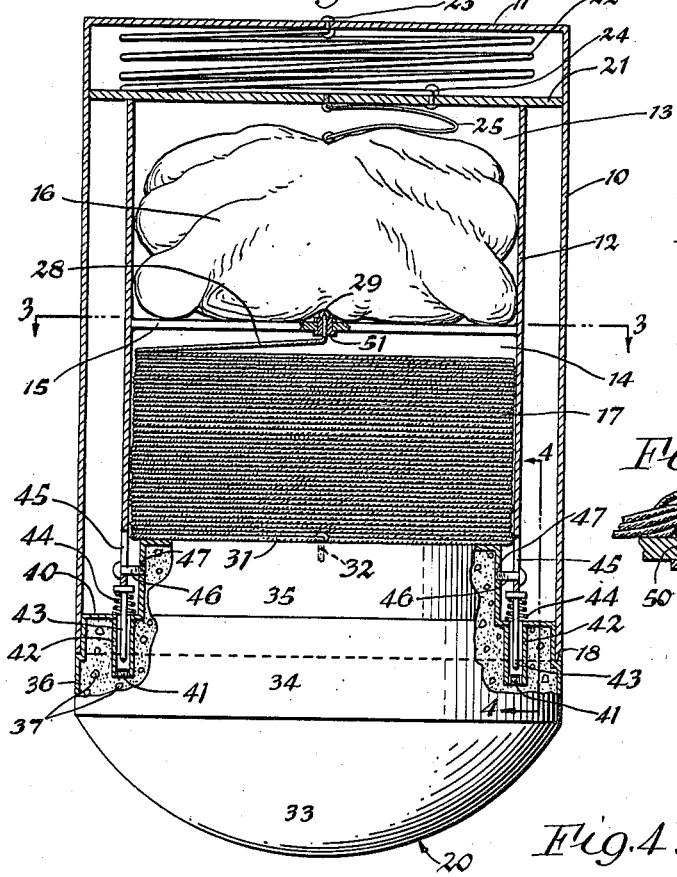
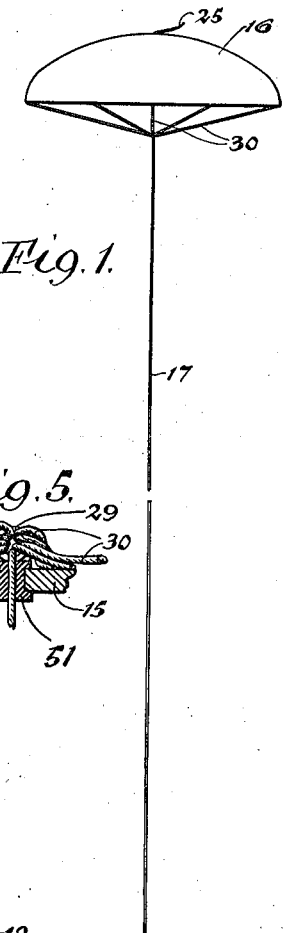
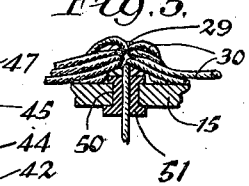
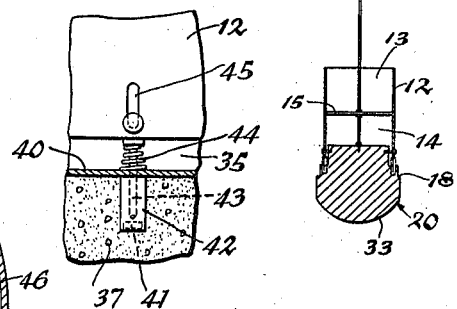
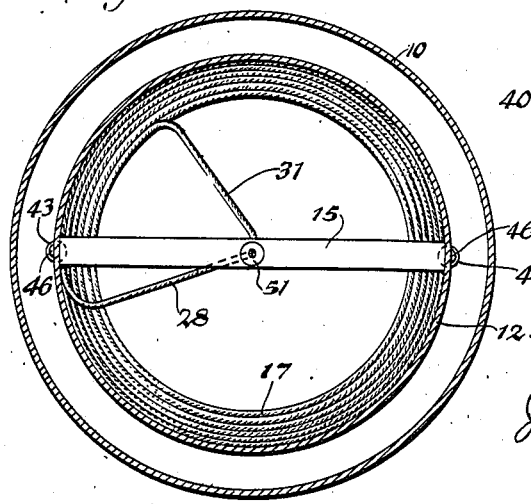
INVENTOR
Joseph Poscavage and George Ricail
BY
Popp and Popp
ATTORNEYS Patented Jan. 4, 1944

2,338,598

UNITED STATES PATENT OFFICE 2,338,598

AERIAL PARACHUTE BOMB

Joseph Poscavage and George Ricail,
Buffalo, N. Y.

Application January 9, 1941, Serial No. 373,782

9 Claims. (Cl. 102—9)

This invention relates to an aerial parachute bomb adapted to be launched from an aircraft and more particularly to such an aerial parachute bomb which can be employed in providing a barrage of slowly descending aerial bombs.

In order to harass enemy aircraft the aerial parachute bombs forming the subject of this invention are intended to be released in numbers from airplanes flying at a greater altitude than the approaching enemy aircraft so that upon launching or releasing these bombs they are caused to descend slowly toward the earth and intercept the path of the approaching enemy aircraft. When the enemy aircraft contacts the bombs they explode and destroy the aircraft.

It is therefore the principal object of the present invention to provide an aerial parachute bomb which can be launched in the air and which upon release automatically opens and slowly descends toward the earth.

Another object is to provide such an aerial parachute bomb in which the bomb is suspended at the end of a long cable by a parachute so that the effective catching range of the bomb is great in a vertical direction. When an enemy aircraft runs into the cable the drag of the parachute will pull the bomb into forceful contact with the aircraft in such manner that the impact explodes the bomb.

Another object is to provide such an aerial parachute bomb the various parts of which can be assembled in compact form so that the same can be mounted in bomb racks of the type now used for bombs.

A further aim is to provide such an aerial parachute bomb which when launched from the airplane automatically releases the parachute so that it is permitted to open and cause the cable, to the lower end of which the bomb proper is secured, to unwind.

A further object is to provide such an aerial parachute bomb in which the cable is unwound or released slowly so that no sudden jerk due to the inertia effect of the bomb is caused when the cable is completely unwound.

A further purpose is to provide such an aerial parachute bomb which can strike the ground at the end of its descent without exploding thereby to eliminate the danger of bombing one's own territory and also permitting the bomb to be repacked or reassembled for use again.

Another aim is to provide such an aerial parachute bomb which can be handled, as when the bomb is being mounted in its rack, without danger of having it explode.

Another object is to provide such an aerial parachute bomb which is simple in construction and operation; which is capable of being readily manufactured in large numbers due to the simplicity of its component parts; and which is inexpensive to construct.

Another aim is to camouflage all the visible parts of such an aerial parachute bomb in black or any other suitable color so that the same can be used with greater effectiveness at night against night bombing.

In the accompanying drawing:

Fig. 1 is a view, on a reduced scale, of an aerial parachute bomb embodying our invention in its opened condition and showing a parachute supporting, by a long cable, a bomb which is shown in section.

Fig. 2 is an enlarged vertical central section through the aerial parachute bomb when packed in its assembled condition.

Fig. 3 is a horizontal transverse section taken on line 3—3, Fig. 2.

Fig. 4 is a fragmentary vertical section taken on line 4—4, Fig. 2.

Fig. 5 is a still further enlarged, fragmentary section similar to Fig. 2 and showing the manner in which the upper end of the cable is secured to the lines of the parachute and also showing the means for retarding the paying out of the cable.

In its assembled form, as shown in Fig. 2, the aerial parachute bomb includes an outer casing 10 of tubular form which has an end wall 11 and is open at its opposite end. An inner metal casing or annular member 12 also of tubular form but open at both ends is arranged within the outer casing 10 and is divided into two compartments 13 and 14 by a member 15 in the form of a cross bar secured in any suitable manner as by welding to the inside of the inner casing. The upper compartment 13 houses a packed parachute 16 and the lower compartment 14 houses a coiled length of cable 17.

The inner tubular casing 12 is shown as being of substantially smaller diameter than the outer tubular casing 10 and also as of substantially shorter length than the outer casing. The lower end of the outer casing rests on an annular shoulder 18 provided on the bomb, indicated generally at 20, so that the outer surface of the casing is continuous with the periphery of the bomb.

Arranged at the upper end of the inner casing is a piston member 21 preferably of disk-like form and a helical compression spring 22 is interposed between the piston and the end wall 11 of the outer casing 10. The spring 22 is shown as being of large diameter and comprises a few large turns so as to permit it to stretch to a substantial length and this spring is secured to the piston member 21 at 24 and the end wall 11 at 23 in any suitable manner. The top of the parachute 16 is connected to the disk by a tear string or rip cord 25. This construction provides parachute opening or releasing means and operates in a manner hereinafter described.

As shown in Figs. 2 and 5 the upper end 28 of the cable 17 is suitably connected to a ring 29 to which are also fastened the lines 30 of the parachute, the lower end 31 of the cable being suitably secured to the bomb 20 as by an eye bolt 32.

The bomb 20 can be of any desired type and as shown includes a bottom section 33, an intermediate section 34 and an upper section 35 of smaller diameter than the intermediate section. The bomb is shown as being encased by a metal casing 36 which contains shrapnel and explosives 37. The shoulder 18 is formed on the casing of the intermediate bomb section and the eye bolt 32 is also secured to the top of the casing of the upper bomb section 5 as shown in Fig. 2.

Means are provided for exploding the bomb and for this purpose a plurality of firing cap assemblies are arranged around a flat 40 provided between the intermediate and upper bomb sections 34, 35, respectively. Two of such firing cap assemblies are shown although it is to be understood that any number may be employed. Each of said firing cap assemblies comprises the usual firing cap 41 arranged at the bottom of a vertical recess provided in the flat 40, the recess being lined by a tubular member 42. The firing cap is in combustible communication with the explosives in the bomb so that when the cap is ignited the explosives are set off. For the purpose of striking the cap 41 the stem of the firing pin 43 is arranged partially in the tubular member 42 and this pin is held in an elevated position by a spiral compression spring 44 which surrounds the stem of the pin and is interposed between the head of the pin and the flat 40. The bottom edge of the inner casing 12 rests on the head of the firing pin and it will be seen that with a plurality of these firing pins arranged concentrically on the flat 40 the bottom end of the casing rests on the heads of the firing pins and the casing is supported thereby. For the purpose of securing the inner casing 12 to the bomb 20 and to guide the movement of the inner casing, the same adjacent its lower end is provided with a plurality of narrow slots 45 which extend longitudinally of the casing, as best shown in Fig. 4. Two of such slots are shown but any number may be employed. Each slot is of sufficient width to receive the stem of a bolt or pin 46 which has an enlarged head which will not pass through the slot. The threaded end of the bolt screws into a threaded opening 47 provided in the bomb casing 36. It will therefore be seen that the inner casing 12, by being arranged between the heads of diametrically arranged pins, is maintained in concentric relation with the heads of the firing pins 43. The ends of the slots 45 limit the movement of the inner casing and it will be seen that, as shown in Fig. 2, the springs 44 urge the pins 46 against the lower ends of the slots 45. However, when the inner casing 12 is caused to move downwardly relative to the bomb against the resistance of the springs 44, in a manner hereinafter described, the firing pins 43 are depressed and strike the firing caps 41 thereby exploding the bomb.

Means are provided for retarding or resisting the free unwinding of the coiled cable 17 so that the bomb 20 will not fall as a freely falling object and will not be suddenly jerked when the cable is completely unwound. For this purpose the cross bar 15 is provided with a central opening 50 in which is mounted a grommet-like insert or lining 51 of friction material such as rubber or the like. The cable 17 passes through the opening in the insert 51 and because the insert or lining snugly embraces the cable the lining frictionally retards the passage of the cable.

*Operation*

In the operation and use of the aerial parachute bomb described above it is intended that the bombs in their assembled condition be stacked in suitable racks in airplanes similar to the bomb racks now employed in military airplanes and be released from these racks by suitable releasing means. Instead of this the assembled aerial parachute bombs can be arranged in rows in the bottom of the airplane with the rip cords attached to the airplane so as to be automatically opened when the bombs are dropped from the airplane.

The outer casing 10 is made of very light weight material such as cardboard or fiber and serves merely as a casing for the other parts of the aerial bomb. When the assembled bomb is discharged the spring 22 tends to expand and since the outer casing 10 is not fixed to the bomb 20 this spring will tend to throw off the outer casing, the spring being fixed to the outer casing and to the piston 21 which is also made of light weight material and which rests on the upper end of the inner casing. Since the nose of the bomb is the heaviest part the bomb will drop in the vertical position shown in Fig. 2 and the removal of the outer casing will be further facilitated by air rushing in the space provided between the inner and outer casings when the lower end of the outer casing separates from the shoulder 18 provided on the bomb. This inrush of air aids the spring in throwing off the outer casing, the spring 22 straightening out to practically the full length of the outer casing. As the outer casing leaves the inner casing the rip cord 25 will pull or jerk the parachute out of the compartment 13 and the parachute will open and be filled out by the air rushing past it. The rip cord is of such strength that the jerk will break the rip cord, as shown in Fig. 1, so that the outer casing will drop off the parachute. However, even if the rip cord does not break it will not impair the functioning of the parachute as it will merely dangle on the end of the parachute by the rip cord.

At this time the aerial bomb as a whole is dropping toward the earth as a freely falling object but with the opening of the parachute the same pulls out the cable 17 through the frictionally lined opening 50 provided on the cross bar 15. The grommet-like lining or insert 51 is designed so as to exert enough friction on the cable passing through it that the free dropping of the bomb is retarded. It will be seen that by the above arrangement the bomb 20 is prevented from dropping as a freely falling object and a sudden jerk is avoided when the cable is completely unwound.

When the cable which can be of any desired length, such as several hundred feet, is completely straightened out the bomb, cable and parachute will descend slowly toward the earth as a unit. With a large number of these aerial parachute bombs grouped in a line or in any other desired manner it will be seen that any enemy aircraft coming in a path intercepted by the straightened out cables will run into the cables. When it is realized that the airplanes are travelling at a high speed it will be readily apparent that when the airplane strikes the cable the drag of the parachute will pull the bomb 20 at the lower end of the cable into forceful contact with the airplane. The inner casing 12 will strike the airplane and this casing will be depressed relative to the bomb against the resistance of the springs 44. The lower end of the inner casing therefore pushes the firing pins into the recesses and into striking contact with the firing caps 41 thereby to explode the bomb. The springs 44 are so designed as to permit this functioning when the inner casing strikes the airplane but if the bomb does not strike an airplane and descends to the ground the spring is strong enough to resist the inertia effect of the inner casing produced by the impact of the bomb with the ground. Thus, the bomb is not exploded when the bomb strikes the ground since the parachute is of such size to permit only a very slow descent of the bomb. This very slow rate of descent of the bomb increases the time period during which the bomb is in effective position in the air.

From the foregoing it will be seen that the present invention provides an aerial parachute bomb which can be launched in assembled form from an airplane; which will release a parachute to support a bomb at the end of a long cable; which descends very slowly toward the earth so that when the cable is struck by an airplane, the parachute will drag the bomb into contact with the airplane and explode the bomb. It will further be seen that the bomb will not explode when it settles on the ground.

We claim as our invention:

1. An aerial parachute bomb adapted to be launched from an aircraft, comprising a bomb, a casing movably connected to said bomb and arranged exteriorly thereof, a parachute compactly arranged in said casing, a cable compactly arranged in said casing and having its opposite ends connected to said bomb and said parachute respectively, means for ejecting said parachute and cable from said casing, said parachute when open supporting said bomb in a pendant position and being adapted to slowly descend toward the earth, and means connected with said bomb and actuated by the movement of said casing relative to said bomb for exploding said bomb.

2. An aerial parachute bomb adapted to be launched from an aircraft, comprising a bomb, a casing movably connected to said bomb and arranged exteriorly thereof and formed to provide an upper and a lower compartment, a parachute compactly arranged in said upper compartment, a comparatively long cable compactly arranged in said lower compartment and having its opposite ends connected to said bomb and said parachute respectively, means for ejecting said parachute and cable from said casing, said parachute when open supporting said bomb in a pendant position and being adapted to slowly descend toward the earth, and means connected with said bomb and actuated by the movement of said casing relative to said bomb for exploding said bomb.

3. An aerial parachute bomb adapted to be launched from an aircraft, comprising a bomb, a plurality of pins extending laterally from said bomb, a casing including an upper and a lower compartment and provided with slots which receives said pins and permit movement of said casing relative to said bomb, a parachute compactly arranged in said upper compartment and a comparatively long cable compactly arranged in said lower compartment and having its opposite ends connected to said bomb and said parachute respectively, means for ejecting said parachute and cable from said casing, said parachute when open supporting said bomb in a pendant position and being adapted to slowly descend toward the earth, and means connected with said bomb and actuated by the movement of said casing relative to said bomb for exploding said bomb and comprising a firing cap in combustible communication with the explosives of said bomb, a firing pin mounted on said bomb in the path of movement of said casing and adapted to strike said cap and spring means for urging said firing pin out of contact with said cap whereby the movement of said casing relative to said bomb effected by impact of said casing with an aerial obstacle actuates said firing pin to strike said cap.

4. An aerial parachute bomb adapted to be launched from an aircraft, comprising a bomb, an outer casing removably connected with said bomb, an inner casing arranged within said outer casing and movably connected to said bomb, a parachute compactly arranged within said inner casing, a cable compactly arranged within said inner casing and connected at one end to said parachute and at its opposite end to said bomb, means interposed between said bomb and outer casing for releasing said outer casing from said bomb and from surrounding said inner casing, and means connected with said bomb and actuated by the movement of said inner casing relative to said bomb for exploding said bomb upon impact of said inner casing with an aerial obstacle.

5. An aerial parachute bomb adapted to be launched from an aircraft, comprising a bomb, an outer casing removably connected with said bomb, an inner casing arranged within said outer casing and movably connected to said bomb, a member secured to said inner casing and dividing said inner casing into two compartments and being provided with an opening, a parachute compactly arranged within one of said compartments, a length of cable compactly arranged within the other of said compartments and connected at one end to said parachute and at its opposite end to said bomb, said cable being adapted to pass through said opening, means interposed between said outer and inner casings for releasing said outer casing from said bomb and from surrounding said inner casing, and means connected with said bomb and actuated by the movement of said inner casing relative to said bomb for exploding said bomb upon impact of said inner casing with an aerial obstacle.

6. An aerial parachute bomb adapted to be launched from an aircraft, comprising a bomb, an outer casing removably connected with said bomb, an inner casing arranged within said outer casing and movably connected to said bomb, a parachute compactly arranged within said inner casing, a cable compactly arranged within said inner casing and connected at one end to said parachute and at its opposite end to said bomb, means interposed between said bomb and outer casing for releasing said outer casing from said bomb and from surrounding said inner casing, and comprising a piston member arranged between the end of said inner casing and the adjacent end wall of said outer casing and spring means arranged between and connected to said end wall and said piston whereby said outer casing will be thrown off by said spring means, means for ejecting said parachute and cable from said inner casing upon the release of said outer casing, and means connected with said bomb and actuated by the movement of said inner casing relative to said bomb for exploding said bomb upon impact of said inner casing with an aerial obstacle.

7. An aerial parachute bomb adapted to be launched from an aircraft, comprising a bomb formed to provide an annular external shoulder surrounding a contracted end part of said bomb, an outer casing having a tubular part and an end wall, the open end of said outer casing fitting over said contracted part of said bomb and engaging said shoulder whereby the periphery of said tubular part is continuous with the periphery of the non-contracted part of said bomb, an inner casing arranged within said outer casing and movably connected with said bomb, a parachute compactly arranged within said inner casing, a cable compactly arranged within said inner casing and having its opposite ends connected to said parachute and said bomb respectively, means interposed between said outer and inner casings for releasing said outer casing from said inner casing, comprising a piston member arranged adjacent the end of said inner casing, a spring interposed between said piston member and said end wall of said outer casing, means connecting said spring to said end wall and means connecting said spring to said piston member, a rip cord connected to said piston member and to said parachute for opening said parachute, and means connected with said bomb and actuated by the movement of said inner casing relative to said bomb for exploding said bomb upon impact of said inner casing with an aerial obstacle.

8. An aerial parachute bomb adapted to be launched from an aircraft, comprising a bomb formed to provide an annular external shoulder surrounding a contracted end part of said bomb, an outer casing having a tubular part and an end wall, the open end of said outer casing fitting over said contracted part of said bomb and engaging said shoulder whereby the periphery of said tubular part is continuous with the periphery of the non-contracted part of said bomb, an inner casing arranged within said outer casing and movably connected with said bomb, a parachute compactly arranged within said inner casing, a cable compactly arranged within said inner casing and having its opposite ends connected to said parachute and said bomb respectively, means interposed between said outer and inner casings for releasing said outer casing from said inner casing, comprising a piston member arranged adjacent the end of said inner casing, a spring interposed between said piston member and said end wall of said outer casing, means connecting said spring to said end wall and means connecting said spring to said piston member, a rip cord connected to said piston member and to said parachute for opening said parachute, means mounted on said inner casing for paying out said cable in such manner as to prevent said bomb from dropping as a freely falling body, said parachute when open supporting said bomb in a pendant position and being adapted to slowly descend toward the earth, and means connected with said bomb and actuated by movement of said inner casing relative to said bomb for exploding said bomb.

9. An aerial parachute bomb, comprising a parachute, a comparatively long cable connected at its upper end to said parachute, a bomb which is round in a horizontal plane and has an end of reduced diameter axially connected to the lower end of said cable and said bomb being formed between its enlarged and reduced ends to provide a shoulder having an annular flat face which faces said parachute, and firing means for exploding said bomb, comprising a plurality of vertical firing pins each of which partially extends into a recess provided in said annular flat face, a firing cap arranged in the bottom of each of said recesses, a spring interposed between said bomb and each firing pin for urging said firing pin out of contact with said firing cap, a tubular member supported by said firing pins, guiding means for said tubular member including a plurality of guiding pins extending laterally from said bomb, each of said guiding pins cooperating with a slot provided in said tubular member thereby to limit the movement of said tubular member relative to said bomb, said bomb exploding when said tubular member is moved downwardly by impact with an aerial obstacle against the resistance of said springs thereby to actuate said firing pin to strike said firing cap.

JOSEPH POSCAVAGE.
GEORGE RICAIL.